United States Patent
Sishtla

(10) Patent No.: US 8,104,298 B2
(45) Date of Patent: Jan. 31, 2012

(54) LUBRICATION SYSTEM FOR TOUCHDOWN BEARINGS OF A MAGNETIC BEARING COMPRESSOR

(75) Inventor: Vishnu M. Sishtla, Manlius, NY (US)

(73) Assignee: Carrier Corporation, Farmington, CT (US)

( * ) Notice: Subject to any disclaimer, the term of this patent is extended or adjusted under 35 U.S.C. 154(b) by 889 days.

(21) Appl. No.: 12/091,098

(22) PCT Filed: Dec. 6, 2005

(86) PCT No.: PCT/US2005/043916
§ 371 (c)(1),
(2), (4) Date: Apr. 22, 2008

(87) PCT Pub. No.: WO2007/067169
PCT Pub. Date: Jun. 14, 2007

(65) Prior Publication Data
US 2008/0245082 A1    Oct. 9, 2008

(51) Int. Cl.
*F25B 31/02* (2006.01)
*F04B 39/02* (2006.01)
*F25B 43/02* (2006.01)
(52) U.S. Cl. .................. 62/84; 417/423.13; 417/365
(58) Field of Classification Search ............. 62/84, 192, 62/468, 498; 417/365, 423.12, 423.13
See application file for complete search history.

(56) References Cited

U.S. PATENT DOCUMENTS

| | | | | |
|---|---|---|---|---|
| 1,575,818 A | * | 3/1926 | Carrier | 62/115 |
| 1,934,189 A | * | 11/1933 | Grier | 417/372 |
| 2,124,239 A | * | 7/1938 | Smith | 417/372 |
| 4,373,356 A | | 2/1983 | Connor | |
| 5,469,713 A | * | 11/1995 | Wardle et al. | 62/84 |
| 5,887,441 A | | 3/1999 | Spauschus et al. | |
| 6,010,315 A | * | 1/2000 | Kishimoto et al. | 417/228 |
| 6,223,554 B1 | | 5/2001 | Adachi | |
| 6,231,319 B1 | * | 5/2001 | Iida et al. | 417/462 |
| 6,434,960 B1 | * | 8/2002 | Rousseau | 62/228.4 |
| 7,240,515 B2 | | 7/2007 | Conry | |
| 2002/0181818 A1 | * | 12/2002 | Bridges | 384/490 |
| 2003/0155830 A1 | * | 8/2003 | Beyer et al. | 310/90.5 |
| 2004/0056541 A1 | * | 3/2004 | Steinmeyer | 310/52 |
| 2004/0112679 A1 | | 6/2004 | Centers | |
| 2011/0067427 A1 | * | 3/2011 | Haller et al. | 62/324.6 |
| 2011/0174009 A1 | * | 7/2011 | Iizuka et al. | 62/305 |

FOREIGN PATENT DOCUMENTS

| | | |
|---|---|---|
| CN | 1512073 | 7/2004 |
| CN | 1639466 | 7/2005 |

OTHER PUBLICATIONS

Search Report PCT/US05/43916.
Chinese Office Action mailed on Mar. 20, 2009.
International Preliminary Report on Patentability mailed on Jun. 19, 2008.

* cited by examiner

*Primary Examiner* — Ljiljana Ciric
*Assistant Examiner* — Alexis Cox
(74) *Attorney, Agent, or Firm* — Carlson, Gaskey & Olds, P.C.

(57) ABSTRACT

A vapor compression system includes a compressor, a condenser, an expansion device and an evaporator. Refrigerant circulates though the closed circuit vapor compression system. Touchdown bearings protect a rotor during power shutdown of the compressor. Liquid refrigerant from the condenser flows along a supply line and lubricates the touchdown bearings. The refrigerant from the touchdown bearings is discharged through an outlet and flows along a discharge line to the evaporator.

13 Claims, 4 Drawing Sheets

LUBRICATION SYSTEM FOR TOUCHDOWN BEARINGS OF A MAGNETIC BEARING COMPRESSOR

This application is a U.S. National Phase application of PCT Application No. PCT/US2005/043916 filed Dec. 6, 2005.

BACKGROUND OF THE INVENTION

The present invention relates generally to a bearing lubrication system that lubricates a touchdown bearing of a compressor equipped with magnetic bearings with liquid refrigerant from a condenser.

A vapor compression system includes a compressor, a condenser, an expansion device and an evaporator. Refrigerant circulates though the closed circuit vapor compression system. The refrigerant exits the compressor through a discharge port at a high pressure and a high enthalpy. The refrigerant then flows through the condenser at a high pressure and rejects heat to an external fluid medium. The refrigerant then flows through the expansion device, which expands the refrigerant to a low pressure. After expansion, the refrigerant flows through the evaporator and absorbs heat from another external fluid medium. The refrigerant then re-enters the compressor through a suction port, completing the cycle.

The compressor includes an impeller, a diffuser, a motor rotor and a motor stator housed in a compressor housing. The rotor is fixed to and rotates with a shaft, and the stator is fixed inside the compressor housing. Hydrodynamic and hydrostatic bearings are commonly used in the compressor. Magnetic bearings reduce power loss and eliminate the need to use oil as a lubricant. Touchdown bearings provide for smooth rotation of the shaft and protect the rotor during power shutdown of the compressor. The touchdown bearings can be ceramic ball bearings or sleeve bearings. If the touchdown bearings are sleeve bearings, the touchdown bearings are made out of a material having tribological properties that withstand shutdown in the absence of lubricant. A drawback to ceramic ball bearings and sleeve bearings is that they are expensive.

Hence, there is a need in the art for a bearing lubrication system that lubricates bearings of a compressor, that uses less expensive materials, such as Babbit material, that provides lower wear rates and that overcomes the drawbacks and shortcomings of the prior art.

SUMMARY OF THE INVENTION

A vapor compression system includes a compressor, a condenser, an expansion device and an evaporator. Refrigerant circulates though the closed circuit vapor compression system. The refrigerant is compressed in the compressor and exits the compressor through a discharge port. The refrigerant then enters the condenser and rejects heat to an external fluid medium. The refrigerant is expanded to a low pressure by the expansion device. After expansion, the refrigerant flows through the evaporator and accepts heat from another external fluid medium. The refrigerant then re-enters the compressor through a suction port, completing the cycle.

The compressor includes an impeller, a diffuser, a main motor rotor, a main motor stator and a magnetic bearing housed in a compressor housing. The main motor stator drives the main motor rotor to rotate through a magnetic field, driving a shaft to reduce a volume of the refrigerant received in compression chambers of the compressor and compress the refrigerant to a high pressure.

A radial touchdown bearing and an axial touchdown bearing protect the rotor during power shutdown of the compressor and protect the magnetic bearing from failure. The radial touchdown bearing defines a cavity that receives a portion of the shaft. The shaft includes an annular collar that extends around a perimeter of the shaft. The axial touchdown bearing encircles the shaft and defines a cavity that receives the annular collar.

Liquid refrigerant from the condenser flows along a supply line and is injected into the cavities defined by the touchdown bearings. The refrigerant provides lubrication to the touchdown bearings, reducing wear. The refrigerant is discharged through an outlet in the compressor housing and flows along a discharge line to the evaporator.

These and other features of the present invention will be best understood from the following specification and drawings.

BRIEF DESCRIPTION OF THE DRAWINGS

The various features and advantages of the invention will become apparent to those skilled in the art from the following detailed description of the currently preferred embodiment. The drawings that accompany the detailed description can be briefly described as follows.

DETAILED DESCRIPTION OF THE PREFERRED EMBODIMENT

Figure 1:
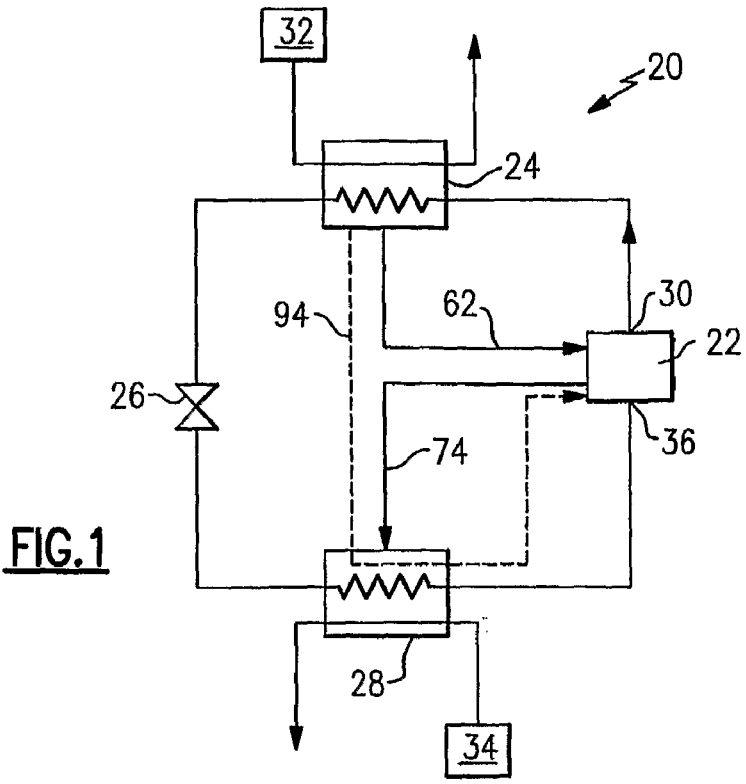
FIG. 1 schematically illustrates a vapor compression system of the present invention including a supply line that provides liquid refrigerant from a condenser to bearings of a compressor.

FIG. 1 illustrates an example vapor compression system 20 including a compressor 22, a condenser 24, an expansion device 26 and an evaporator 28. Refrigerant circulates though the closed circuit vapor compression system 20. The refrigerant exits the compressor 22 through a discharge port 30 at a high pressure and a high enthalpy. The compressor 22 can be a screw compressor, a rotary compressor, a turbo compressor, or any type of compressor.

The refrigerant then flows through the condenser 24. An external fluid medium 32, such as water or air, flows through the condenser 24 and exchanges heat with the refrigerant flowing through the condenser 24. The pressure of the refrigerant in the condenser 24 is typically approximately 100 psi. The refrigerant rejects heat to the external fluid medium 32 and exits the condenser 24 at a relatively low enthalpy and a high pressure in a liquid state.

The refrigerant is then expanded by the expansion device 26, reducing the pressure of the refrigerant. The expansion device 26 can be a mechanical expansion device (TXV), an electronic expansion valve (EXV) or other type of known expansion device.

After expansion, the refrigerant flows through the evaporator 28 and absorbs heat from another external fluid medium 34, such as air or water. The pressure of the refrigerant in the evaporator 28 is typically approximately 50 psi. The refrigerant exits the evaporator 28 at a relatively high enthalpy and a low pressure in a vapor state. The refrigerant then re-enters a suction port 36 of the compressor 22, completing the cycle.

Alternately, the liquid refrigerant from the condenser 24 flows along a supply line 94 and is subcooled by the evaporator 28 to lubricate the touchdown bearings 48 and 52. Subcooling the liquid with the evaporator 28 ensures that liquid refrigerant is injected into the bearings 48 and 52 that would otherwise be a liquid-vapor mixture.

Figure 2A:
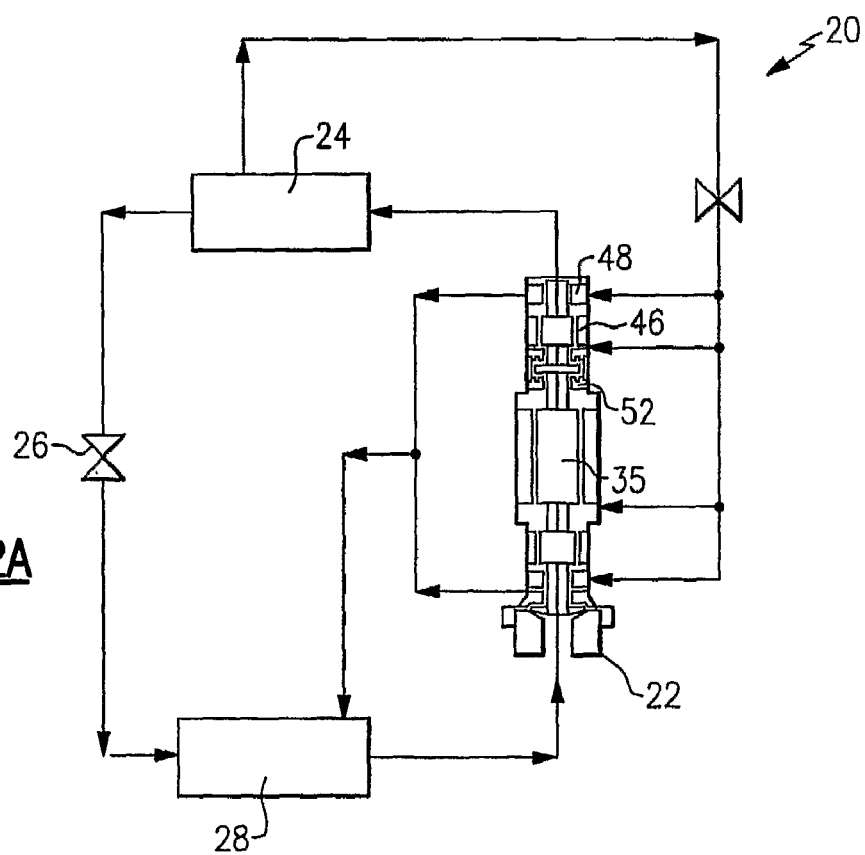
FIG. 2a schematically illustrates bearings of the compressor.

FIG. 2a shows a schematic view of the compressor 22 and the major internal parts. The compressor 22 includes a motor 35 including a main motor rotor 110, a main motor stator 112, two sets of radial magnetic bearings 46, two touchdown bearings 48 and one set of axial touchdown bearings 52.

Figure 2B:
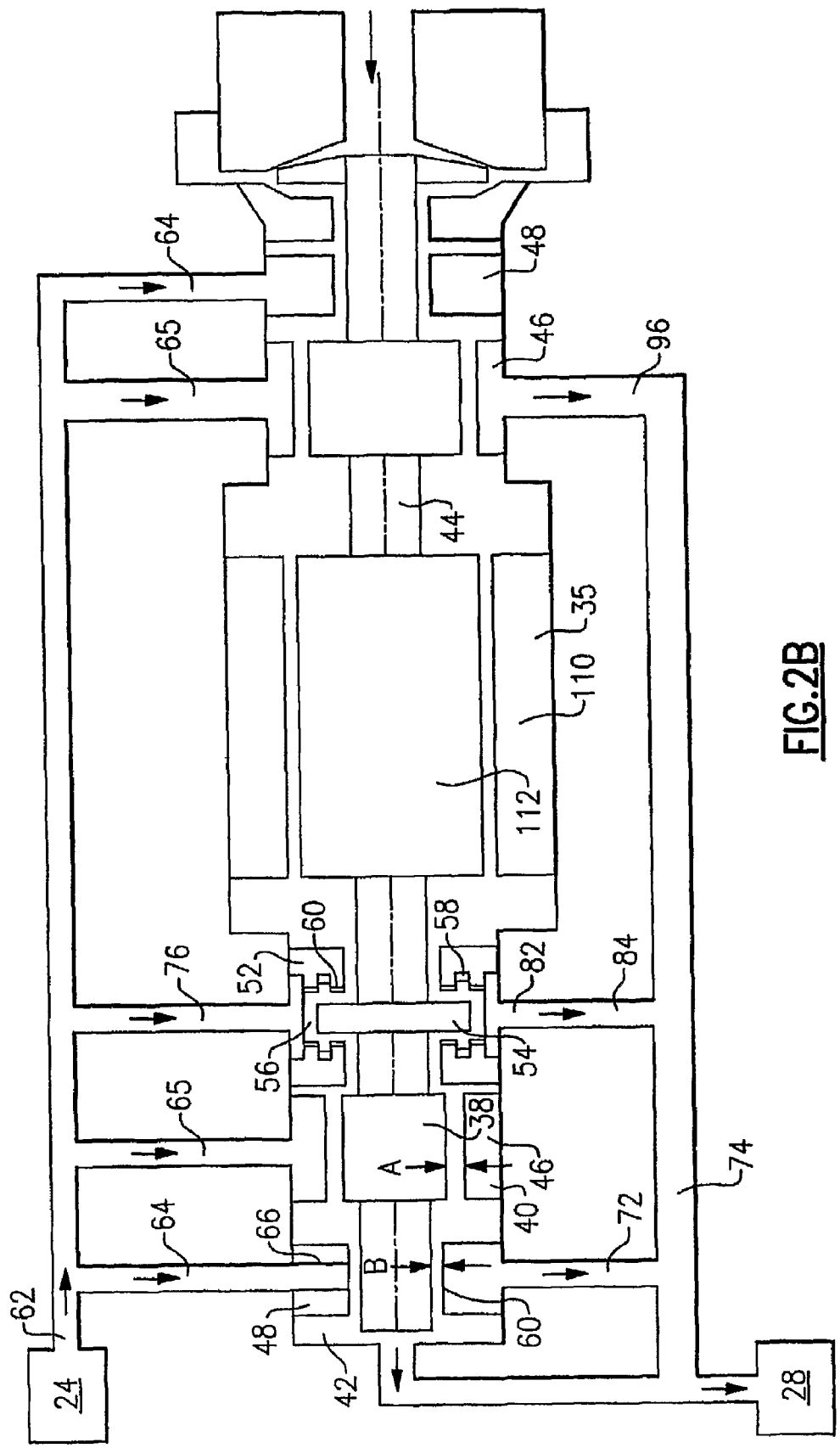
FIG. 2b schematically illustrates the compressor including touchdown bearings lubricated by the liquid refrigerant from the condenser.

FIG. 2b shows the flow of the lubrication to the touchdown bearings 48 and 52 and the magnetic bearings 46. The compressor 22 includes the main motor rotor 110 and the main motor stator 112 housed in a compressor housing 42. The main motor stator 112 is fixed inside the compressor housing 42. The main motor rotor 110 is fixed to and rotates with a shaft 44. The main motor stator 112 drives the main motor rotor 110 to rotate, driving the shaft 44. Rotation of the shaft 44 reduces a volume of the refrigerant received in compression chambers (not shown) of the compressor 22, compressing the refrigerant to a high pressure.

A rotor 38 and a stator 40 define a magnetic bearing 46 that allows for smooth rotation of the main motor rotor 110 to reduce power loss and to eliminate the need for oil to provide lubrication. A clearance A is provided between the rotor 38 and the stator 40.

A radial touchdown bearing 48 radially protects the main motor rotor 110 during power shutdown of the compressor 22 and protects the magnetic bearing 46 from failure. The radial touchdown bearing 48 defines a cavity 50 that receives a portion of the shaft 44. A clearance B is provided between the radial touchdown bearing 48 and the shaft 44. The clearance B is less than the clearance A, helping the radial touchdown bearing 48 contact the shaft 44 in the event of a power failure.

An axial touchdown bearing 52 axially protects the main motor rotor 110 during power shutdown of the compressor 22 and protects the magnetic bearing 46 from failure. The shaft 44 includes an annular collar 54 that extends around a perimeter of the shaft 44. The axial touchdown bearing 52 encircles the shaft 44 and defines a cavity 56 that receives the annular collar 54. A magnet 58 is also received in the axial touchdown bearing 52. The axial touchdown bearing 52 can also be a separate bearing.

The touchdown bearings 48 and 52 can be ceramic ball bearings or a sleeve bearing. If the touchdown bearings 48 and 52 are a sleeve bearing, touchdown bearings 48 and 52 can be made out of a material having tribological properties that withstand power shutdown. For example, touchdown bearings 48 and 52 can be made of tin or a lead based Babbit material. Alternately, touchdown bearings 48 and 52 can have a coating of Babbit material 60 on the surface that contacts the shaft 44.

Liquid refrigerant from the condenser 24 flows along a supply line 62 to lubricate the touchdown bearings 48 and 52. The refrigerant can also flow around the magnetic bearing 46 to remove heat from the magnetic bearing 46.

Liquid refrigerant from the supply line 62 flows along a line 64 and is injected into the radial touchdown bearing 48 through an opening 66 in the compressor housing 42. The refrigerant enters the cavity 50 and provides lubrication to the radial touchdown bearing 48, reducing wear. The refrigerant from the radial touchdown bearing 48 is discharged through an outlet 70 in the compressor housing 42 and flows along a line 72 and enters a discharge line 74 that carries the refrigerant to the evaporator 28.

Liquid refrigerant from the supply line 62 flows along a line 76 and is injected into the axial touchdown bearing 52 through an opening 78 in the compressor housing 42. The refrigerant enters the cavity 56 defined by the axial touchdown bearing 52. The refrigerant provides lubrication to the axial touchdown bearing 52, reducing wear. The refrigerant from the axial touchdown bearing 52 is discharged through an outlet 82 in the compressor housing 42 and flows along a line 84 and enters a discharge line 74 that carries the refrigerant to the evaporator 28.

Liquid refrigerant also flows along supply lines 65 to supply liquid refrigerant to the magnetic bearings 46. The liquid refrigerant is discharged from the compressor housing 42 through a discharge line 96 that carries the refrigerant to the evaporator 28.

Due to the pressure difference of the refrigerant in the condenser 24 (approximately 100 psi) and the refrigerant in the evaporator 28 (approximately 50 psi), an external pump is not needed to supply the refrigerant from the condenser 24 to the touchdown bearings 48 and 52. The pressure difference allows the refrigerant to flow from the condenser 24, near the touchdown bearings 48 and 52 of the compressor 22 and into the evaporator 28.

Figure 3:
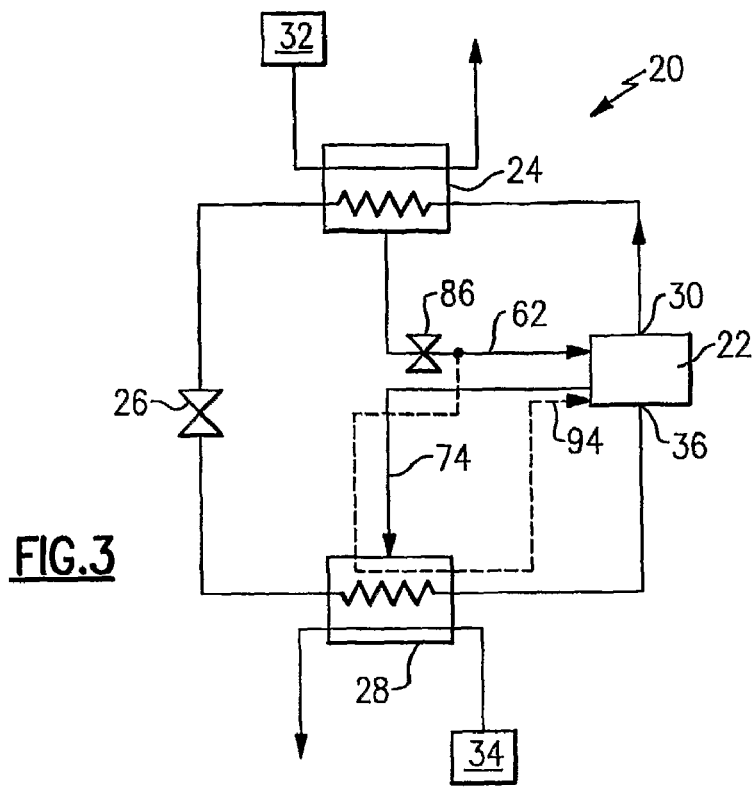
FIG. 3 schematically illustrates another embodiment of the vapor compression system including a fail safe valve on the supply line.

As shown in FIG. 3, the vapor compression system 20 can include an optional fail safe solenoid valve 86 located on the supply line 62 from the condenser 24 to the compressor 22. If a power failure occurs, the fail safe solenoid valve 86 remains open and the refrigerant from the condenser 24 continues to provide lubrication to the touchdown bearings 48 and 52. Alternately, the liquid refrigerant from the condenser 24 flows along the supply line 94 and is subcooled by the evaporator 28 to lubricate the touchdown bearings 48 and 52.

Figure 4:
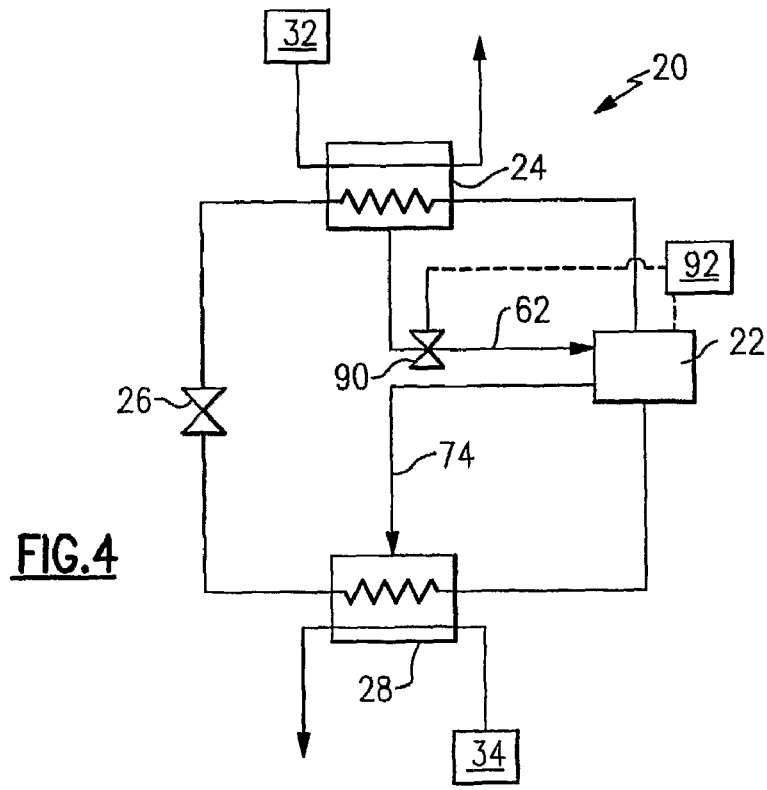
FIG. 4 schematically illustrates another embodiment of the vapor compression system including a valve on the supply line that only opens when the compressor is shutdown.
Figure 5:
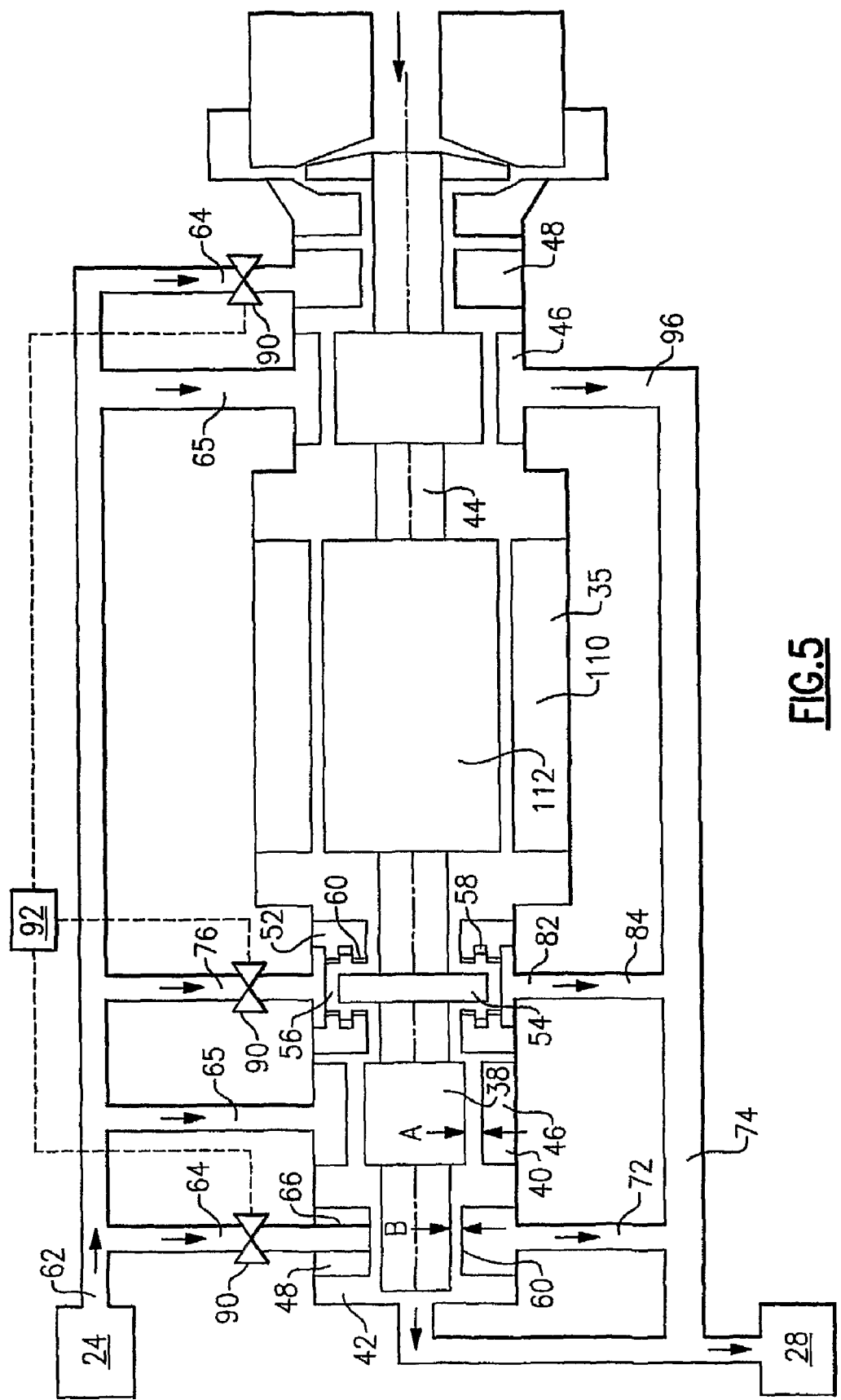
FIG. 5 schematically illustrates the compressor including multiple refrigerant circuits to provide refrigerant to different bearings of the compressor.

As shown in FIGS. 4 and 5, in yet another embodiment, the refrigerant from the condenser 24 constantly flows around the magnetic bearing 46 to cool the magnetic bearing 46. The refrigerant from the condenser 24 is only provided to the touchdown bearings 48 and 52 during power shutdown of the compressor 22. In this embodiment, the refrigerant circuits for each of the magnetic bearing 46 and the touchdown bearings 48 and 52 are separate. The refrigerant flows along the supply line 62 and then flows along the line 65 to the magnetic bearing 46. The refrigerant exits the magnetic bearing 46 and flows along the line 96 and enters the discharge line 74 that carries the refrigerant to the evaporator 28. A valve 90 located on the lines 64 and 76 opens only when power shutdown occurs to supply the liquid refrigerant from the condenser 24 to the touchdown bearings 48 and 52. During normal operation, the valves 90 are closed. When a control 92 detects power shutdown of the compressor 22, a signal is sent to open the valves 90 and allow the liquid refrigerant to flow to the touchdown bearings 48 and 52. Alternately, a single line having a single valve 90 provides the liquid refrigerant to both the touchdown bearings 48 and 52.

The foregoing description is only exemplary of the principles of the invention. Many modifications and variations of the present invention are possible in light of the above teachings. The preferred embodiments of this invention have been disclosed, however, so that one of ordinary skill in the art would recognize that certain modifications would come within the scope of this invention. It is, therefore, to be understood that within the scope of the appended claims, the invention may be practiced otherwise than as specifically described. For that reason the following claims should be studied to determine the true scope and content of this invention.

What is claimed is:

1. A vapor compression system comprising:
   a compressor to compress a refrigerant to a high pressure, the compressor including a magnetic bearing and at least one touchdown bearing;
   a condenser for cooling the refrigerant;
   a refrigerant supply line that constantly supplies the refrigerant from the condenser to the compressor to lubricate the magnetic bearing;
   an evaporator for heating the refrigerant;
   a refrigerant discharge line that discharges the refrigerant that lubricates the magnetic bearing to the evaporator;
   a control that monitors shutdown of the compressor; and
   a valve, wherein the control opens the valve to allow the refrigerant to flow to the at least one touchdown bearing when the control detects that the compressor is shutdown.

2. The system as recited in claim 1 further including an expansion device to expand the refrigerant to a low pressure.

3. The system as recited in claim 1 wherein the compressor includes a motor stator fixed inside a compressor housing, a shaft rotatable relative to the motor stator, and a motor rotor fixed to the shaft.

4. The system as recited in claim 1 wherein the compressor includes a shaft, the at least one touchdown bearing includes a radial touchdown bearing that surrounds a portion of the shaft, and a radial touchdown bearing clearance is provided between the shaft and the radial touchdown bearing.

5. The system as recited in claim 4 wherein the magnetic bearing includes a bearing rotor and a bearing stator, a magnetic bearing clearance is provided therebetween, and the radial touchdown bearing clearance is less than the magnetic bearing clearance.

6. The system as recited in claim 1 wherein the compressor includes a shaft, the at least one touchdown bearing includes an axial touchdown bearing, and the shaft includes an annular collar surrounded by the axial touchdown bearing.

7. A vapor compression system comprising:
   a compressor to compress a refrigerant to a high pressure, the compressor including a magnetic bearing, at least one of a radial touchdown bearing and an axial touchdown bearing;
   a condenser for cooling the refrigerant;
   a refrigerant supply line that constantly supplies the refrigerant from the condenser to the compressor to lubricate the magnetic bearing;
   an evaporator for heating the refrigerant; and
   a refrigerant discharge line that discharges the refrigerant that lubricates the magnetic bearing to the evaporator;
   a control that monitors shutdown of the compressor; and
   a valve, wherein the control opens the valve to allow the refrigerant to flow to the at least one of the radial touchdown bearing and the axial touchdown bearing when the control detects that the compressor is shutdown.

8. A vapor compression system comprising:
   a compressor to compress a refrigerant to a high pressure, the compressor including a magnetic bearing and at least one touchdown bearing;
   a condenser for cooling the refrigerant;
   a refrigerant supply line that constantly supplies the refrigerant from the condenser to the compressor to lubricate the magnetic bearing;
   another refrigerant supply line that supplies the refrigerant from the condenser to the compressor to lubricate the at least one touchdown bearing;
   an evaporator for heating the refrigerant;
   a refrigerant discharge line that discharges the refrigerant that lubricates the magnetic bearing and the at least one touchdown bearing to the evaporator;
   a control that monitors shutdown of the compressor; and
   a valve on the another refrigerant supply line, wherein the control opens the valve to allow the refrigerant to flow to the at least one touchdown bearing when the control detects that the compressor is shutdown.

9. A method of lubricating a magnetic bearing of a vapor compression system, the method comprising the steps of:
   compressing a refrigerant to a high pressure in a compressor;
   protecting components of the compressor with a magnetic bearing and at least one touchdown bearing;
   cooling the refrigerant in a condenser;
   constantly supplying the refrigerant from the condenser to the magnetic bearing to provide lubrication;
   supplying the refrigerant from the condenser to the at least one touchdown bearing to provide lubrication when the compressor is shutdown, wherein the refrigerant is only supplied to the at least one touchdown bearing when the compressor is shutdown;
   heating the refrigerant in an evaporator; and
   providing the refrigerant that lubricates the magnetic bearing and the at least one touchdown bearing to the evaporator.

10. The method as recited in claim 9 wherein the at least one touchdown bearing includes a radial touchdown bearing that surrounds a portion of a shaft of a compressor, and a radial touchdown bearing clearance is provided between the shaft and the radial touchdown bearing.

11. The method as recited in claim 9 wherein the at least one touchdown bearing includes an axial touchdown bearing, and a shaft of the compressor includes an annular collar surrounded by the axial touchdown bearing.

12. The system as recited in claim 1 wherein the refrigerant in the refrigerant supply line bypasses the evaporator when flowing from the condenser to the compressor.

13. The system as recited in claim 8 wherein the at least one touchdown bearing is at least one of an axial touchdown bearing and a radial touchdown bearing.

* * * * *